May 13, 1958     W. N. PLATTE     2,834,870
ARC WELDING GUN
Filed March 9, 1956     2 Sheets-Sheet 1
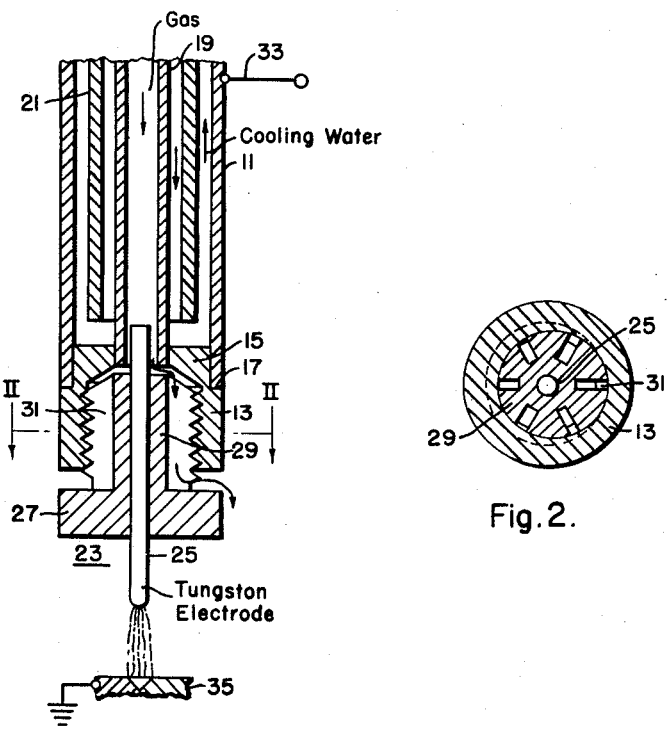
Fig. 1.
Fig. 2.
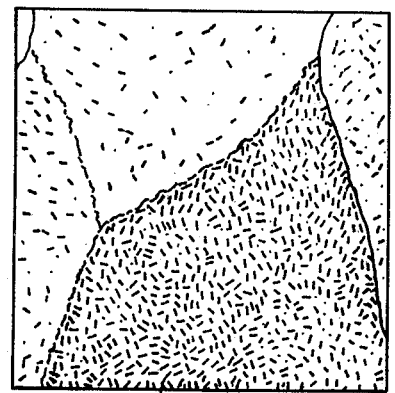
Fig. 3.
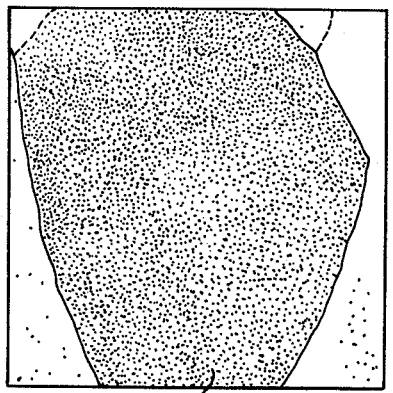
Fig. 4.

May 13, 1958 W. N. PLATTE 2,834,870
ARC WELDING GUN

Filed March 9, 1956 2 Sheets-Sheet 2

WITNESSES
Bernard R. Gieguay
Leon M. Garman

INVENTOR
William N. Platte
BY
Hymen Diamond
ATTORNEY

United States Patent Office 2,834,870
Patented May 13, 1958

2,834,870

ARC WELDING GUN

William N. Platte, Boston, Pa., assignor to Westinghouse Electric Corporation, East Pittsburgh, Pa., a corporation of Pennsylvania Application March 9, 1956, Serial No. 570,566

6 Claims. (Cl. 219—75)

This invention relates to arc welding and has particular relation to guns for arc welding in a shield of a non-reactive gas. By a non-reactive gas is meant a gas such as a noble gas which does not react with the material being welded. Such non-reactive gases are frequently contaminated with gases such as oxygen, nitrogen and water vapor which do react with the material being welded.

In recent times it has become desirable to fabricate parts from materials such as molybdenum, zirconium, and hafnium by arc welding. It has been found that in welding such materials, the presence of even small amounts of such gases as oxygen, nitrogen or water vapor has a deleterious effect on the weld. Such materials are usually welded in a shield of a non-reactive gas and specifically of an inert gas like argon or helium which may be highly purified. But even as purified, the shielding gas includes small quantities of oxygen and nitrogen and these are sufficient to reduce materially the soundness and ductility of the weld. The minute proportion of these contaminating gases even in a highly purified shielding gas may result in reduction of ductility, hot cracking and loss of corrosion resistance, depending on the material being welded and the contaminating component of the gas.

In accordance with the teachings of the prior art, the above mentioned contaminating gases are removed by passing the shielding gas over gettering trains consisting of heated reactive material in a closed chamber. Usually, for this purpose, a furnace containing the gettering material is introduced into the shielding gas supply line. This means of eliminating contaminating gases introduces equipment into a welding system which is not readily portable. Further, this practice does not readily permit determination of the quality of the gas of the shield so that welding may proceed even when the shielding gas is substantially contaminated and highly costly material may be damaged.

It is accordingly broadly an object of this invention to provide apparatus for the welding of highly reactive materials such as molybdenum, zirconium, hafnium without resorting to the above described gettering trains.

Another object of this invention is to provide readily portable apparatus for welding such reactive materials in a shield of non-reactive gas, which apparatus shall include facilities for indicating the quality of the shielding gas as regards its freedom from contaminating gas deleterious to the welding.

A specific object of this invention is to provide a welding gun particularly suitable for the welding of materials such as molybdenum, zirconium and hafnium.

In accordance with the broader aspects of this invention, the gettering material is disposed in the region of the welding arc itself and heated either by the arc or by available external means and the shielding gas is passed over this gettering material as it passes to the arc. In accordance with the specific aspects of this invention, a welding gun is provided which includes the gettering material as a component thereof. The gettering material is so disposed that as the shielding gas passes out of the gas channel of the gun, it passes over the gettering material and directly into the arc. The gettering material being heated by the arc is effective in removing the contaminating gases. Further, as the gettering material removes the gases, it is discolored and indicates the extent of the contamination in the shielding gas.

The novel features considered characteristic of this invention are described generally above. The invention itself, both as to its organization and its method of operation, will be understood from the following description of a specific embodiment when read in connection with the accompanying drawing, in which:

Figure 1 is a view in longitudinal section showing the essential features of a gun in accordance with this invention;

Fig. 2 is a view in transverse section taken along line II—II of Fig. 1;

Fig. 3 is a reproduction of a photomicrograph of a portion of a weld bead of molybdenum produced with a gun shown in Fig. 1 at the beginning of a welding operation;

Fig. 4 is a reproduction of a photomicrograph of a molybdenum weld bead produced with a gun shown in Fig. 1 near the end of a welding operation;

Figure 5:
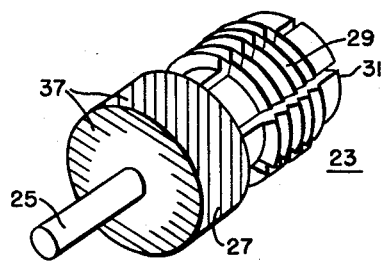
Fig. 5 is a view in perspective of a gettering unit in accordance with this invention shaded to show the discoloration produced by contamination.

The apparatus shown in Figs. 1 and 2 is the end of the barrel portion of a gun in accordance with this invention for welding with a non-consumable electrode in a shield of non-reactive gas. Such a gun would include a handle with the usual triggering mechanisms, and electrical and mechanical connections to a cooling water supply system, a gas system, and a power supply. These parts are not shown as they do not concern the present invention.

The gun includes an external electrically conducting hollow cylindrical casing 11 to the end of which an electrically conducting internally threaded shell 13 having a stem 15 extending from a shoulder 17 is secured. The end of the cylindrical casing 11 engages the shoulder 17 of the shell 13 and the stem 15 extends into and is secured in the end of the casing 11. The stem 15 has a central opening in which a hollow central tube 19 is secured. The tube 19 constitutes a portion of the shielding gas supply channel of the gun and is connected to the shielding gas supply means (not shown). The gas passes downward through the center of the tube into the internal region bounded by the shell 13.

The gun also includes an intermediate tube 21 which divides the space between the internal tube 19 and the casing 11 and which serves to guide the cooling water as it flows through the gun. The cooling water enters the gun through the space between the internal tube 19 and the intermediate tube 21 and passes out of the gun through the space between the intermediate tube 21 and the casing 11.

Figure 6:
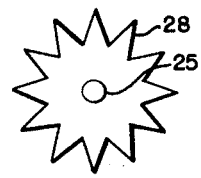
Fig. 6 is an end view showing a modification of this invention.

A gettering unit 23 which also serves as a collet for holding the electrode 25 and as an indicator of the quality of the shielding gas is secured in the shell 13. This gettering unit is composed of a material such as titanium, zirconium or tantalum and includes a disc 27 from which an externally threaded stem 29 extends integrally. To increase the area of exposure of the gettering material to the gas, the disc 27 may be replaced by a fluted disc 28 as shown in Fig. 6. The stem 29 and the disc 27 have a coextensive central opening in which the electrode 25, which may for example be composed of tungsten, is secured. The stem 29 of the gettering unit 23 is provided with a plurality of longitudinal slots 31. The gettering unit 23 is screwed into the shell 13 so that the internal end of the stem 29 is a short distance below the end of the gas supply tube 19.

In the use of the gun, the gas supply tube 19 connected to a shielding gas supply and the annular spaces between this tube 19 and the intermediate tube 21 and the outer casing 11 are connected to cooling water inlet and outlet fittings (not shown). The outer casing 11 is connected to the hot terminal 33 of a power supply.

During welding, an arc is fired between the electrode 25 in the gettering unit 23 and the work 35 to be welded. The gas for shielding the arc flows through the tube 19 and the slots 31 and passes around the disc 27 to sheath the arc. The arc current flows through the casing 11, the shell 13 and the gettering unit 23 and the electrode 25. The gettering unit 23 is heated by the current flow through it and by the arc and operates effectively to decontaminate the gas. It has been found in welding molybdenum with the apparatus disclosed, including a gettering unit 23 of titanium, that the temperature of the gettering unit is during welding of the order of 1000° F. At this temperature the gettering unit will tend to pick up oxygen in a gas until the partial pressure of the oxygen is $10^{-60}$ millimeters.

The effectiveness of the gun in accordance with this invention for producing sound welds with highly reactive materials is demonstrated by the photomicrographs shown in Figs. 3 and 4. Both photomicrographs were made from portions of beads produced in welding arc-cast molybdenum deoxidized by carbon in a shielding atmosphere which on analysis was found to have traces of oxygen and about .02% nitrogen. The welding was carried out with a non-consumable electrode of tungsten and a gun in accordance with this invention having a titanium gettering collet (23).

Fig. 3 is a reproduction of a photomicrograph of a portion of the bead at the start of the welding operation enlarged 300 times. Since at this time the collet 23 has not yet reached the temperature at which it is effective in decontaminating the gas, it is to be expected that the bead would not be of the highest quality. This is borne out by the photomicrograph which shows lines indicating the presence of small nitride needles. Spherical carbides from the original material are also present but are reduced in number due to small amounts of oxygen in the atmosphere.

Fig. 4 is a reproduction of a photomicrograph of a portion of the bead produced near the end of the weld. At this time, the gettering unit (collet) 23 will have reached the temperature at which it is effective in decontaminating the gas and this is borne out by the photomicrograph. In this case, there are only the dots which indicate the presence of spheroidal carbides present in the original material.

The manner in which the gettering unit indicates the presence of contaminating gases is demonstrated by Fig. 5 which shows the gettering unit after having been used in a welding operation. The shading 37 corresponds to a blue-gray discoloring of the unit which indicates that the unit has reacted with contaminating gases. Such a unit may be revitalized by heating in a vacuum at a temperature above the oxygen solubility temperature for the gettering material. This process drives the oxygen into solution in the gettering material, permitting it to be used again. This repetitive use may continue until the oxygen saturates the gettering material.

Figure 7:
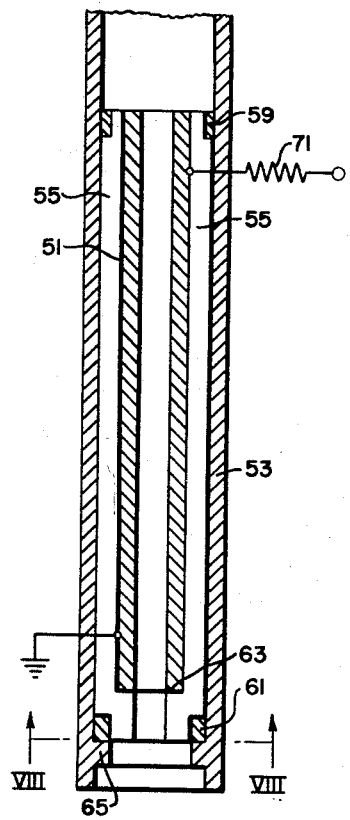
Fig. 7 is a fragmental view in longitudinal section showing the essential features of a modification of this invention in accordance with its broader aspects.
Figure 8:
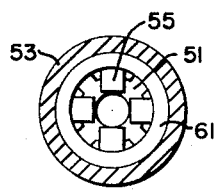
Fig. 8 is a view taken along line VIII—VIII of Fig. 7.

In the modification shown in Figs. 7 and 8, the gettering material is in the form of a fluted tube 51 suspended within the gas supply tube 53. The tube 51 is sheathed by a plurality of thermally and electrically insulating rods 55 which may be composed of a ceramic material and is held within these rods by bands 59 and 61. The rods may be provided with shoulders 63 to prevent the tube 51 from slipping out. The assembly 51, 55, 59, 61 is in the form of a cartridge which is slipped into the gas tube 53 and rests on projections 65 from the lower rim of this tube. The tube 51 may be heated by conducting current through it; the current may be derived from the welding source, preferably through a shunt resistor 71. When the gettering material is in the gas tube 53 as shown in Figs. 7 and 8, the collet may be of ordinary structure and material.

Of the specific embodiments of this invention disclosed herein, those shown in Figs. 1, 2 and 6 are of particular importance, having marked advantages over the prior art apparatus and over other embodiments. While only these embodiments are disclosed, many modifications thereof are feasible. This invention then is not to be restricted except insofar as is necessitated by the spirit of the prior art.

I claim as my invention:

1. An arc welding gun for welding work in a shield of non-reactive gas comprising a gun body having a channel for transmitting said gas and including means for supporting an electrode in welding relationship to said work, and means for supplying current for welding to said electrode, the said gun being characterized by gettering means connected to said gun body and interposed at the terminus of said channel, said gettering means being so connected to said arc that during welding said gettering means is heated to a temperature such that it is effective in removing material such as water vapor, oxygen and nitrogen from said gas.

2. An arc welding gun for welding work with a non-consumable electrode in a shield of non-reactive gas comprising a gun body having a channel for transmitting said gas, a collet connected to said body for holding said electrode in welding relationship to said work, said collet being so disposed relative to said channel that the gas passing out of said channel passes over at least the surface of a portion of said collet in intimate contact therewith, and means for supplying current for welding to said electrode, said means including a current path in which said portion of said collet is included, the said gun being characterized by the fact that said collet is composed of a gettering material.

3. An arc welding gun for welding work with a non-consumable electrode in a shield of non-reactive gas comprising a gun body having a channel for transmitting said gas, a collet connected to said body for holding said electrode in welding relationship to said work, said collet being so disposed relative to said channel that the gas passing out of said channel passes over at least the surface of a portion of said collet in intimate contact therewith, and means for supplying current for welding to said electrode, said means including a current path in which said portion of said collet is included, said collet being composed of a gettering material, the said material being composed of one or more of the class consisting of titanium, zirconium and tantalum.

4. An arc welding gun particularly for welding molybdenum with a tungsten electrode in a shield of non-reactive gas comprising a gun body having a channel for transmitting said gas, a collet connected to said body for holding said electrode in welding relationship to said work, said collet being so disposed relative to said channel that the gas passing out of said channel passes over at least the surface of a portion of said collet in intimate contact therewith, and means for supplying current for welding to said electrode, said means including a current path in which said portion of said collet is included, said collet being composed essentially of titanium.

5. An arc welding gun for welding work with an electrode essentially of tungsten in a shield of non-reactive gas comprising a gun body having a channel for transmitting said gas, said body having a cylindrical shell at the terminus of said gas channel, a collet connected to said body for holding said electrode in welding relationship to said work, said collet being of generally T-section including a generally cylindrical stem from which a disk extends, said stem being secured in said shell, said collet also having longitudinal channels through which gas may flow, and means for supplying current for welding to said electrode, said means including a current path in which said collet is included, said collet being composed of a gettering material of one or more of the class consisting of titanium, zirconium and tantalum.

6. An arc welding gun for welding work with a non-consumable electrode in a shield of non-reactive gas comprising a gun body having a channel for transmitting said gas, a collet connected to said body for holding said electrode in welding relationship to said work, said channel including a tube the outlet opening of which terminates adjacent said collet, means for supplying current for welding to said electrode, a gettering means mounted in said tube along the path of the gas flow therein, and means connected to said current supply means for heating said gettering means.

References Cited in the file of this patent

UNITED STATES PATENTS

| | | |
|---|---|---|
| 1,892,819 | Van Gessel | Jan. 3, 1933 |
| 2,468,808 | Drake | May 3, 1949 |
| 2,514,060 | Himmelman | July 4, 1950 |
| 2,690,982 | Gillmeister | Oct. 5, 1954 |
| 2,819,383 | Johnston | Jan. 7, 1958 |